(12) United States Patent
Lee et al.

(10) Patent No.: US 12,174,761 B2
(45) Date of Patent: *Dec. 24, 2024

(54) OPERATION METHOD OF AN ACCELERATOR AND SYSTEM INCLUDING THE SAME

(71) Applicants: SAMSUNG ELECTRONICS CO., LTD., Suwon-si (KR); SNU R&DB FOUNDATION, Seoul (KR)

(72) Inventors: Seung Wook Lee, Suwon-si (KR); Soojung Ryu, Seoul (KR); Jintaek Kang, Seoul (KR); Sunjung Lee, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,979

(22) Filed: Jun. 22, 2023

(65) Prior Publication Data

US 2023/0342311 A1 Oct. 26, 2023

Related U.S. Application Data

(63) Continuation of application No. 17/165,018, filed on Feb. 2, 2021, now Pat. No. 11,726,929.

(30) Foreign Application Priority Data

Feb. 26, 2020 (KR) .................. 10-2020-0023750

(51) Int. Cl.
*G06F 12/02* (2006.01)
*G06F 7/544* (2006.01)
(Continued)

(52) U.S. Cl.
CPC ........ *G06F 13/1668* (2013.01); *G06F 7/5443* (2013.01); *G06F 13/28* (2013.01); *G06N 3/04* (2013.01); *G06N 3/10* (2013.01)

(58) Field of Classification Search
CPC .... G06F 13/1668; G06F 13/28; G06F 7/5443; G06N 3/04; G06N 3/10
See application file for complete search history.

(56) References Cited

U.S. PATENT DOCUMENTS 9,418,011 B2 * 8/2016 Soares ............... G06F 12/0862
9,928,179 B2 * 3/2018 Avudaiyappan .... G06F 12/0859
(Continued)

FOREIGN PATENT DOCUMENTS

JP 4386410 B2 1/2004
KR 10-0552429 B1 2/2006
(Continued)

OTHER PUBLICATIONS

Li et al. "Smartshuttle: Optimizing off-chip memory accesses for deep learning accelerators." *2018 Design, Automation & Test in Europe Conference & Exhibition. IEEE*, 2018 (pp. 343-348).
(Continued)

*Primary Examiner* — Cheng Yuan Tseng
(74) *Attorney, Agent, or Firm* — NSIP Law

(57) ABSTRACT

An accelerator, an operation method of the accelerator, and an accelerator system including the accelerator are disclosed. The operation method includes receiving one or more workloads assigned on an accelerator, determining reuse data of the workloads based on hardware resource information and/or a memory access cost of the accelerator when a plurality of processing units included in the accelerator performs the workloads, and providing a result of performing the workloads.

22 Claims, 7 Drawing Sheets

(51) Int. Cl.
  *G06F 13/16*   (2006.01)
  *G06F 13/28*   (2006.01)
  *G06N 3/04*    (2023.01)
  *G06N 3/10*    (2006.01)

(56) References Cited

U.S. PATENT DOCUMENTS

| | | | |
|---|---|---|---|
| 9,977,663 B2 | 5/2018 | Rong et al. | |
| 10,909,039 B2* | 2/2021 | Vemulapalli | G06F 12/0888 |
| 11,010,308 B2* | 5/2021 | Kim | G06N 20/10 |
| 11,726,929 B2* | 8/2023 | Lee | G06F 9/505 |
| | | | 710/5 |
| 2013/0155103 A1 | 6/2013 | Kakarlapudi et al. | |
| 2018/0300617 A1 | 10/2018 | McBride et al. | |
| 2019/0294570 A1 | 9/2019 | Singh et al. | |
| 2021/0263870 A1* | 8/2021 | Lee | G06N 3/063 |

FOREIGN PATENT DOCUMENTS

| | | |
|---|---|---|
| KR | 10-1362561 B1 | 2/2014 |
| KR | 10-2019-0036317 A | 4/2019 |
| WO | WO 2017/173754 A1 | 10/2017 |

OTHER PUBLICATIONS

Kiani et al. "Efficient Cache Performance Modeling in GPUs Using Reuse Distance Analysis" *ACM Transactions on Architecture and Code Optimization* (*TACO*) vol. 15, issue No. 4, article 58. Dec. 19, 2018 (pp. 1-24).

Yan et al. "HyGCN: A Gcn Accelerator with Hybrid Architecture" *IEEE International Symposium on High Performance Computer Architecture* (*HPCA*) Feb. 22, 2020 (pp. 15-29).

Extended European Search Report issued on Jun. 23, 2021 in counterpart European Patent Application No. 21155980.2 (12 pages in English).

Chen, Yu-Hsin, et al., "Eyeriss: An Energy-Efficient Reconfigurable Accelerator for Deep Convolutional Neural Networks", IEEE Journal of Solid-State Circuits, vol. 52, No. 1, Nov. 8, 2016, (p. 127-138).

Anonymous, "Hardware Acceleration", Wikipedia, Jan. 9, 2020, (7 Pages in English).

European Summons to Oral Proceedings Issued on Mar. 11, 2024, in Counterpart European Patent Application No. 21155980.2 (17 Pages in English).

* cited by examiner

OPERATION METHOD OF AN ACCELERATOR AND SYSTEM INCLUDING THE SAME

CROSS-REFERENCE TO RELATED APPLICATIONS

This application is a continuation of application Ser. No. 17/165,018, which claims the benefit under 35 USC § 119(a) of Korean Patent Application No. 10-2020-0023750 filed on Feb. 26, 2020, in the Korean Intellectual Property Office, the entire disclosures of which are incorporated herein by reference for all purposes.

BACKGROUND

1. Field

The following description relates to an operation method of an accelerator and system including the same.

2. Description of Related Art

As artificial intelligence (AI) technology progresses, there is a desire for specialized AI hardware that may perform inference and learning through operations. Various devices are being developed as hardware dedicated to the implementation of AI.

Such dedicated hardware for AI may be embodied by, for example, a central processing unit (CPU) and a graphics processing unit (GPU), or by a field-programmable gate array (FPGA) and an application-specific integrated circuit (ASIC) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operation method of an accelerator includes receiving one or more workloads assigned by a host controller configured to control the accelerator comprising a plurality of processing elements, determining, upon the plurality of processing elements performing the workloads, reuse data of the workloads based on at least one of hardware resource information and a memory access cost of the accelerator processing elements, and providing a result of performing the workloads to the host controller.

The determining of the reuse data may include determining the reuse data with a least number of accesses by the accelerator to an external memory when the processing elements perform the workloads.

The hardware resource information of the accelerator may include at least one of usage information of a multilevel memory included in the accelerator, usage information of the processing elements, or system cache information.

The multilevel memory may include at least one of a level 0 memory accessible by one of the processing elements, a level 1 memory accessible by a portion of the processing elements, wherein the subset is a number greater than one, or a level 2 memory accessible by the processing elements.

The determining of the reuse data may further include dynamically determining the reuse data based on a characteristic of the workloads.

The memory access cost may include an access cost for the external memory and an access cost for the multilevel memory included in the accelerator.

The access cost for the external memory may be greater than the access cost for the multilevel memory.

The access cost for the multilevel memory may increase for a memory portion of the multilevel memory that is shared by a greater number of processing elements among the processing elements.

At least one of the hardware resource information and the memory access cost may be determined through an extension offloaded to a direct memory access (DMA) configured to control data input to the multilevel memory or data output from the multilevel memory.

The determining of the reuse data may include determining a tiling method to be applied to data input for performing a workload of the workloads based on the hardware resource information of the accelerator, and determining a size of the reuse data based on the determined tiling method.

The determining of the reuse data may include determining the reuse data for at least one of the multilevel memory and to each layer of a neural network corresponding to a workload.

The reuse data may be stored in the multilevel memory in the accelerator and may not be transmitted to the external memory of the accelerator.

Each of the processing elements may include a level 0 memory accessible by a corresponding processing unit, a level 0 DMA configured to control a data input and output of the level 0 memory and at least one of monitor and profile data input to or output from the level 0 memory, a multiplier-accumulator (MAC) configured to perform an operation involved with a workload of the workloads assigned to the processing unit, and a level 0 controller configured to control one of the level 0 memory, the level 0 DMA, and the MAC, or a combination thereof.

The accelerator may be included in a user terminal to which data to be recognized using a neural network based on a workload is input, or in a server configured to receive the data to be recognized from the user terminal.

In another general aspect, an accelerator includes a plurality of processing elements configured to perform one or more workloads assigned by a host controller, and a multilevel memory configured to be accessible by at least one of the processing elements. When the processing elements perform the workloads, reuse data of the workloads may be determined based on at least one of hardware resource information and a memory access cost of the accelerator and stored in the multilevel memory.

In still another general aspect, an accelerator system includes an accelerator including a plurality of processing elements configured to perform one or more workloads and a multilevel memory having different access costs, an external memory of the accelerator, and a host controller configured to assign the workloads to the accelerator. When the processing elements perform the workloads, the accelerator may determine reuse data of the workloads based on at least one of hardware resource information and a memory access cost of the accelerator.

In still another general aspect, an operation method of an accelerator, includes receiving workloads assigned by a host controller configured to control the accelerator comprising processing elements, dynamically determining, upon sequential workloads being performed by the processing elements, reuse data of the workloads based on any two of hardware resource information, a memory access cost of the accelerator, and characteristics of the workloads, and providing a result of performing the workloads to the host controller. The reuse data is data reutilized in a subsequent operation.

The determining of the reuse data may include determining the reuse data with a least number of accesses by the accelerator to an external memory when the processing elements perform the workloads.

The hardware resource information of the accelerator may include usage information of a multilevel memory comprised in the accelerator. The multilevel memory may include a level 0 memory accessible by one of the processing elements, a level 1 memory accessible by a subset of the processing elements, wherein the subset is a number greater than one, and a level 2 memory accessible by the processing elements.

The memory access cost may include an access cost for an external memory of the accelerator and an access cost for a multilevel memory comprised in the accelerator, and the access cost for the external memory may be greater than the access cost for the multilevel memory.

The access cost for the multilevel memory may increase based on a number of the processing elements having access to each of levels 0, 1, and 2 of the multilevel memory.

Other features and aspects will be apparent from the following detailed description, the drawings, and the claims.

Figure 1:
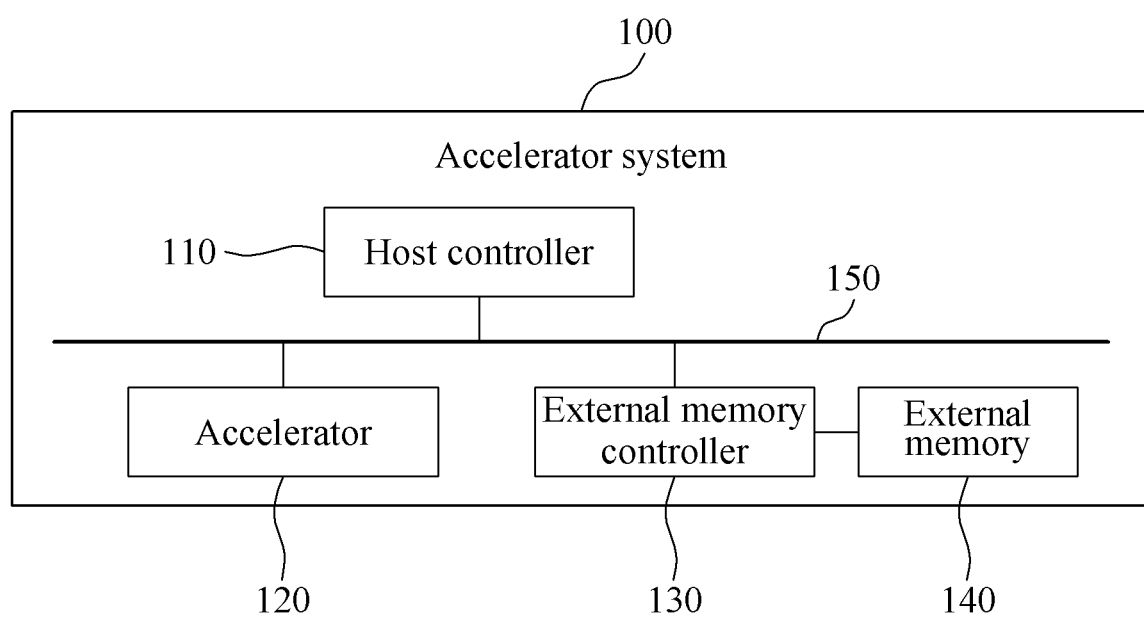
FIG. 1 is a diagram illustrating an example of an accelerator system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 is a diagram illustrating an example of an accelerator system.

Referring to FIG. 1, an accelerator system 100 may include a host controller 110, an accelerator 120, an external memory controller 130, and an external memory 140. The host controller 110, the accelerator 120, the external memory controller 130, and the external memory 140 may communicate with one another through a bus 150.

The host controller 110 may be a device configured to control respective operations of components included in the accelerator system 100, and may include a central processing unit (CPU), for example. In an example, the host controller 110 may assign one or more workloads to the accelerator 120. A workload may be an instruction that instructs the accelerator 120 to execute a neural network for object recognition, speech recognition, pattern recognition, computer vision, and machine translation, for example. The host controller 110 may assign, to the accelerator 120, the workloads based on one or more requested works or tasks.

The accelerator 120 may be an artificial intelligence (AI) accelerator configured to execute a neural network based on an assigned workload and infer data to be input. The accelerator 120 may be a separate processor distinguished from the host controller 110. That is, the accelerator 120 may simultaneously perform a single or a plurality of workloads assigned by the host controller 110. The accelerator 120 may process a workload more effectively independent of the host controller 110 that may be used for general computing purposes.

The neural network may include a plurality of layers. In an example, the neural network may include an input layer, a plurality of hidden layers, and an output layer. Each of the layers may include a plurality of nodes each referred to as an artificial neuron. Each of the nodes may indicate a calculation unit having at least one input and output, and the nodes may be connected to one another. A weight may be set for a connection between nodes, and be adjusted or changed. The weight may increase, decrease, or maintain a related data value to determine an influence of the data value on a final result. To each node included in the output layer, weighted inputs of nodes included in a previous layer may be input. A process in which weighted data is input from a layer to a subsequent layer of the layer may be referred to as propagation.

Operations based on the neural network may be performed in the accelerator 120. To perform the operations, a plurality of processing units (or processing elements) and a multilevel memory that are included in the accelerator 120 may be used. The multilevel memory may be a memory accessible by, at least, one of the processing units, and may include a scratchpad memory and/or a system cache, for example. The scratchpad memory may be an on-chip memory included in the accelerator 120, for example, a static random-access memory (SRAM) that is accessible through an address space. The system cache may be a last level cache (LLC), for example. The scratchpad memory may not be larger than a dynamic RAM (DRAM) in terms of memory capacity, but have a smaller access cost than the DRAM.

Based on a characteristic of the neural network described above, a result of a current operation may be used for a subsequent operation. Thus, rapid operation processing may be enabled by storing, in the multilevel memory, data, for example, an intermediate operation result, that is to be used again in a subsequent layer, and minimizing an access cost when performing an operation. However, due to a relatively small capacity of the multilevel memory, it may not be practically possible to store all sets of required data in the multilevel memory, and a portion of the data may be stored in an external memory, for example, the external memory 140 illustrated in FIG. 1.

The external memory 140 may refer to a memory disposed outside the accelerator 120, and be a DRAM used as a main memory of the accelerator system 100, for example. The external memory 140 may be accessible through the external memory controller 130. When a memory present inside the accelerator 120 is insufficient for the accelerator 120 to perform the workloads, the external memory 140 may be used.

The external memory 140 may have a capacity larger than that of the multilevel memory inside the accelerator 120. However, memory accessing cost for from the accelerator 120 to the external memory 140 may be greater than a memory accessing cost for such an internal multilevel memory. Such memory accessing cost may indicate an amount of power and/or time that is used to access, read, or write data from or in the memory.

Thus, to improve performance of the accelerator system 100, it may be desirable to minimize accesses from the accelerator 120 to the external memory 140. That is, it may be possible to minimize accesses to the external memory 140 by storing, in the multilevel memory instead of the external memory 140, data required for the accelerator 120 to perform the workloads and/or data to be used again in a subsequent layer, for example, intermediate operation result data. Such data to be stored in the multilevel memory in the accelerator 120 may be referred to herein as reuse data.

Hereinafter, examples will be further described in detail.

Figure 2:
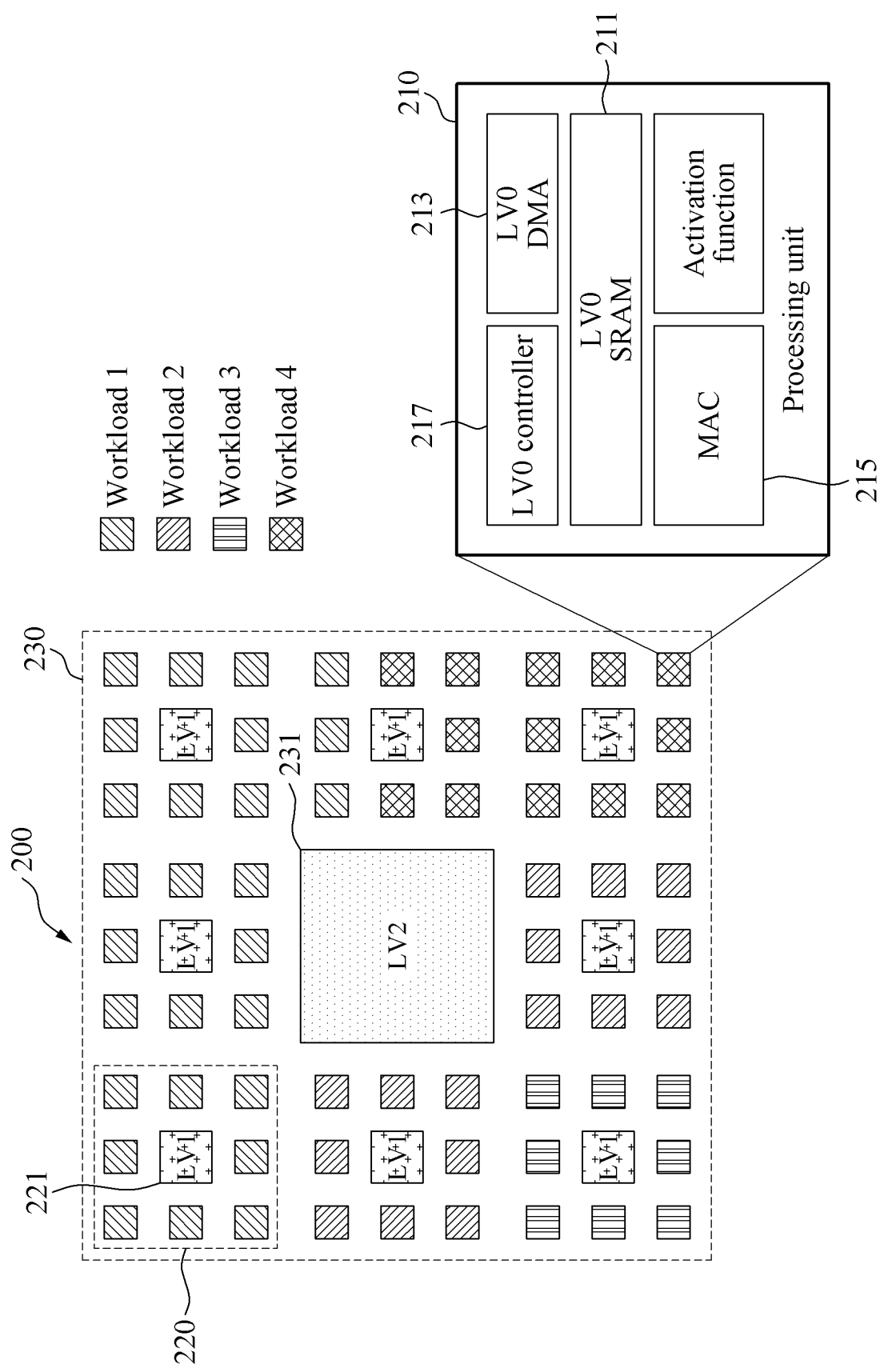
FIG. 2 is a diagram illustrating an example of an accelerator.

FIG. 2 is a diagram illustrating an example of an accelerator.

Referring to FIG. 2, an accelerator 200 may include a plurality of processing units (or processing elements) and a multilevel memory accessible by at least one of the processing units. The multilevel memory may be a collective description of a level (LV) 0 memory 211, an LV1 memory 221, and an LV2 memory 231 in the accelerator 200.

A processing unit 210, which is one of the processing units, may include an LV0 memory 211, an LV0 direct memory access (DMA) 213, a multiplier-accumulator (MAC) 215, and an LV0 controller 217. The processing unit 210 may be a neural processing unit (NPU), a graphics processing unit (GPU), a CPU, a tensor processing unit (TPU), or the like.

The LV0 memory 211 may be a memory accessible through a corresponding processing unit 210. That is, the LV0 memory 211 may be accessible only through the processing unit 210, among the processing units, included in the accelerator 200.

The LV0 DMA 213 may control input data and/or output data of the LV0 memory 211, according to an instruction from the LV0 controller 217. The LV0 DMA 213 may read data from the LV0 memory 211 or write data in the LV0 memory 211 based on information associated with a source, a destination, and a data size that are included in the instruction from the LV0 controller 217.

In this example, data to be input to the LV0 memory 211 or output from the LV0 memory 211 may be monitored and/or profiled. The monitoring and/or profiling may be performed by the LV0 DMA 213 or a separate element. Through the monitoring and/or profiling, an access cost of the LV0 memory 211, usage information of the LV0 memory 211, and a type of data stored in the LV0 memory 211 may be verified. For example, the LV0 DMA 213 may verify a usage percentage indicated by the usage information of the LV0 memory 211, and which workload is involved with the data stored in the LV0 memory 211. Hereinafter, examples will be further described based on a case in which the monitoring and/or profiling is performed by the LV0 DMA 213 for the convenience of description.

The MAC 215 may perform an operation involved with a workload assigned to the processing unit 210. For example, the MAC 215 may perform a multiply-accumulate operation on a given data. In addition, the MAC 215 may apply an activation function to the given data. The activation function may be sigmoid, hyperbolic tangent (tanh), or a rectified linear unit (ReLU), for example.

The LV0 controller 217 may be a device configured to control components included in the processing unit 210. For example, the LV0 controller 217 may control the LV0 memory 211, the LV0 DMA 213, and the MAC 215.

The foregoing description of the processing unit 210 may be applied to each of the processing units included in the accelerator 200. That is, the accelerator 200 may include processing units that each performs operations independently.

In an example, each "n" processing units, among the processing units, may cluster together. In this example, n is a natural number greater than 1 and less than the number of the processing units included in the accelerator 200. That is, a subset of the processing units included in the accelerator 200 may work together to form a cluster, for example, a processing unit cluster 220.

The processing units included in the cluster 220 may share one LV1 memory 221. That is, the LV1 memory 221 may be accessible by the processing units in the cluster 220. For example, even though operations respectively performed in a first processing unit and a second processing unit, among the processing units, in the cluster 220 are different from each other, a portion of data required for both operations may be common. The common data is stored in the LV1 memory 221, rather than it is stored in an LV0 memory included in each of the first processing unit and the second processing unit. Thus, the first processing unit and the second processing unit share the common data, thereby, improving the overall system operation efficiency. In the example of FIG. 2, each of the processing units may access an LV1 memory adjacent to each of the processing units.

In an example, an LV1 DMA configured to control a data input and output of the LV1 memory 221 may monitor and/or profile data input to or output from the LV1 memory 221. In addition, there may also be an LV1 controller to control the LV1 memory 221 and the LV1 DMA.

In addition, an entirety 230 of the processing units may share the LV2 memory 231. That is, the LV2 memory 231 may be accessible by the processing units included in accelerator 200. For example, there may be processing units that share a portion of data required to perform an operation, although not clustering together to form a same cluster, among the processing units included in the accelerator 200. In this example, such processing units may not share the data through an LV1 memory, but effectively share the common data through the LV2 memory 231, thereby increasing the overall operation efficiency. Similarly, in an example, an LV2 DMA configured to control a data input and output of the LV2 memory 231 may monitor and/or profile data input to or output from the LV2 memory 231. In addition, there is also an LV2 controller to control the LV2 memory 231 and the LV2 DMA.

As described above, each of the processing units may access a corresponding LV0 memory, an LV1 memory adjacent to each of the processing units, and an LV2 memory of the accelerator 200, and use these memories to perform respectively assigned workloads. The accelerator 200 may include the multilevel memory having hierarchical memories. In an example, each of an LV0 memory, an LV1 memory, and an LV2 memory may be a scratchpad memory and/or a system cache having a lower access cost than a DRAM, which is an external memory.

In addition, a DMA and a controller included in the accelerator 200 may be of a hierarchical multilevel type.

In the example of FIG. 2, the processing units included in the accelerator 200 may simultaneously perform four workloads. For example, a workload with a relatively greater operation amount may be assigned to a greater number of processing units and processed therein, and a workload with a relatively less operation amount may be assigned to a smaller number of processing units and processed therein.

It is illustrated in FIG. 2 for the convenience of description that, in a non-limiting example, each eight processing units of 64 processing units cluster together to form a total of eight clusters, and three level memories are used to perform the four workloads (Workload 1, Workload 2, Workload 3, and Workload 4). However, various numbers of processing units, workloads, and levels may be applied without restriction.

Figure 3:
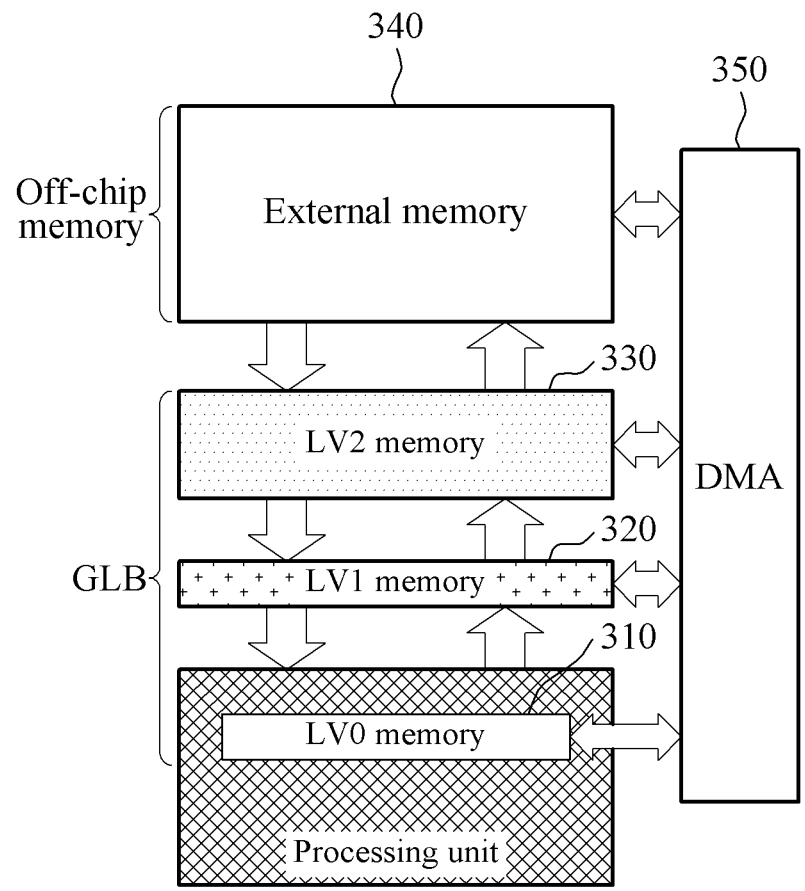
FIG. 3 is a diagram illustrating an example of a multilevel memory and an example of an external memory.

FIG. 3 is a diagram illustrating an example of a multilevel memory and an example of an external memory.

In FIG. 3, an LV0 memory 310, an LV1 memory 320, an LV2 memory 330, an external memory 340, a DMA 350 are illustrated in terms of their functionalities for the convenience of description.

The LV0 memory 310, the LV1 memory 320, and the LV2 memory 330 may be disposed as a global buffer (GLB) in an accelerator. The LV2 memory 330 may be a memory shared by a plurality of processing units included in the accelerator, and the LV1 memory 320 may be a memory shared by some of the processing units. The LV0 memory 310 may be included in a processing unit and not be shared with another processing unit. In the accelerator, there are the LV0 memory 310 provided in number corresponding to the number of the processing units included in the accelerator, the LV1 memory 320 provided in number corresponding to the number of clusters of the processing units, and the LV2 memory 330 provided as a single LV2 memory.

The external memory 340 may be an off-chip memory disposed outside the accelerator and include, for example, a DRAM, a three-dimensional (3D) memory such as a high bandwidth memory (HBM), and a processing in memory (PIM). The external memory 340 may also be referred to herein as an LV3 memory for the convenience of description.

The LV0 memory 310, the LV1 memory 320, the LV2 memory 330, and the external memory 340 may be used when a workload is performed in a processing unit, and a memory access cost may differ for each level. For example, the memory access cost may increase as the level increases. That is, an access cost of the LV0 memory 310 may be the lowest, and an access cost of the external memory 340 may be the highest.

The DMA 350 is also illustrated in terms of its functionality. A DMA may be separately provided for each level, and used to read or write data from or in a corresponding level memory. For example, there are an LV0 DMA configured to control input data and/or output data of the LV0 memory 310, an LV1 DMA configured to control input data and/or output data of the LV1 memory 320, an LV2 DMA configured to control input data and/or output data of the LV2 memory 330, and an LV3 DMA configured to control input data and/or output data of the external memory 340, separately. The LV0 memory 310, the LV1 memory 320, the LV2 memory 330, and the external memory 340 may exchange data with one another through the DMAs provided for respective levels.

Figure 4:
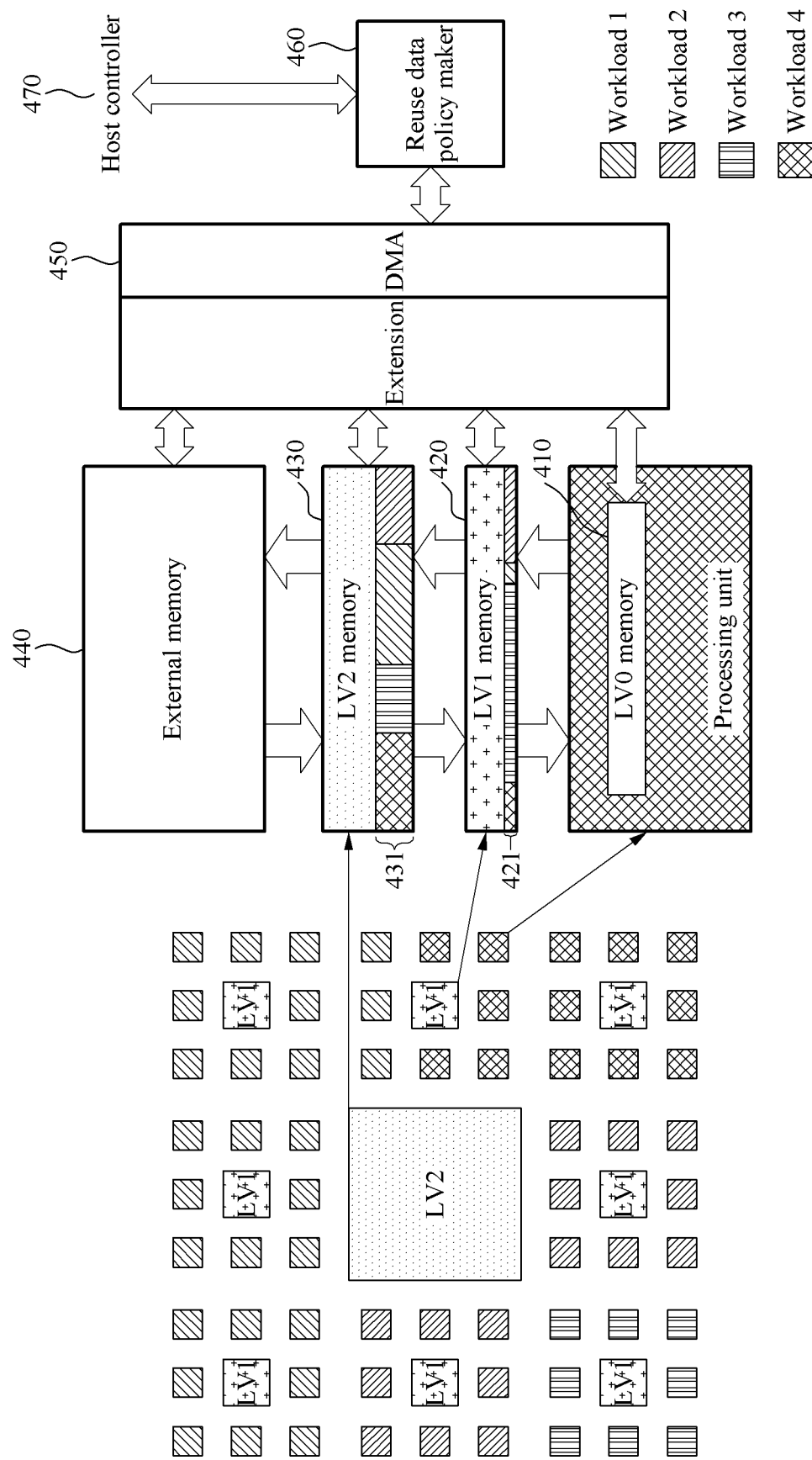
FIG. 4 is a diagram illustrating an example of determining reuse data.

FIG. 4 is a diagram illustrating an example of determining reuse data.

In the example FIG. 4, an LV0 memory 410, an LV1 memory 420, an LV2 memory 430, an external memory 440, a DMA 450, a reuse data policy maker 460, and a host controller 470 are illustrated in terms of their functionalities for the convenience of description.

In an example, through an extension of the DMA 450, data input to a corresponding level memory or data output from the level memory may be monitored and/or profiled, and a result of the monitoring and/or profiling may be transmitted to the host controller 470. The extension may indicate that a function of such monitoring and/or profiling of input and output data of a corresponding level memory is additionally provided, or off-loaded, in the DMA 450. It is illustrated in FIG. 4, for the convenience of description, that such a monitoring and/or profiling operation is performed in the extension of the DMA 450. However, a separate element that performs the monitoring and/or profiling operation may be applied without restriction. Hereinafter, the example of FIG. 4 will be described based on a case in which the monitoring and/or profiling operation is performed through the extension of the DMA 450.

The DMA 450 may verify usage information of a corresponding level memory. For example, an LV2 DMA may verify usage information 431 of the LV2 memory 430 for each workload. The usage information 431 may include, for example, information associated with a use rate of the LV2 memory 430 and an amount used, for each workload. In addition, an LV1 DMA may verify usage information 421 of the LV1 memory 420. In another example of FIG. 4, an LV0 DMA may verify usage information of the LV0 memory 410. Such memory usage information for each level that is verified by respective level DMAs may be transmitted to the host controller 470.

The host controller 470 may assign one or more workloads to an accelerator based on the memory usage information for each level. For example, when there is a relatively large amount of multilevel memory available because a multilevel memory of the accelerator is not used much, for example, the host controller 470 may assign a greater number of workloads or assign a workload having a greater operation amount. In contrast, when there is a relatively small amount of multilevel memory available because the multilevel memory of the accelerator is used much, for example, the host controller 470 may assign a smaller number of workloads or assign a workload having a less operation amount.

When the workloads are assigned by the host controller 470, the reuse data policy maker 460 may determine reuse data of the workloads. The reuse data policy maker 460 may operate in a controller configured to control the DMA 450, and be embodied as a controller that is separately included for each level as in the DMA 450. For example, an LV2 controller configured to control the LV2 DMA may determine reuse data to be stored in the LV2 memory 430. In addition, an LV1 controller configured to control the LV1 DMA may determine reuse data to be stored in the LV1 memory 420. Similarly, an LV0 controller configured to control the LV0 DMA may determine reuse data to be stored in the LV0 memory 410.

The reuse data may be determined based on hardware resource information and/or a memory access cost of the accelerator. The reuse data may refer to data that is utilized again in a subsequent operation when operations are performed in sequential order according to the workloads, and is to be stored in the multilevel memory in the accelerator. For example, data that is more frequently used in subsequent operations may be stored in a memory having a lower access cost and then used afterward.

The hardware resource information of the accelerator may include usage information of the multilevel memory included in the accelerator, and usage information of a plurality of processing units included in the accelerator. The usage information of the multilevel memory may indicate availability and/or usage information of a memory for each level. The usage information of the processing units may include usage efficiency information of each processing unit.

In an example, based on the hardware resource information of the accelerator, a tiling method that is to be applied to data input to perform a workload may be determined. The tiling method may refer to a method by which, when input data is too large to be processed at one time, the input data is divided into a plurality of tiles and each tile is processed. When dividing the input data for performing the workload into the tiles, a tile size may be determined based on the hardware resource information of the accelerator. For example, when there is a great amount of available hardware resources of the accelerator, the tile size may be determined to be large. In contrast, when there is a less amount of available hardware resources of the accelerator, the tile size may be determined to be small. According to the tiling method determined as described above, a size of the reuse data may be determined. For example, the size of the reuse data may be determined to correspond to the tile size.

The memory access cost may include an access cost for the external memory 440 of the accelerator and for the multilevel memory of the accelerator. For example, the access cost for the external memory 440 may be greater than the access cost for the multilevel memory. The access cost for the multilevel memory may increase for a memory shared by a greater number of processing units. For example, the LV2 memory 430 may be shared by all the processing units included in the accelerator, and thus have a greatest access cost among memories of the multilevel memory. In contrast, the LV0 memory 410 may not be shared by another processing unit, but be accessible only by a corresponding processing unit, and thus have a lowest access cost among the memories of the multilevel memory.

For example, data that is frequently used in a subsequent operation or work may be determined to be reuse data to be stored in a lower-level memory; however, only a smaller number of processing units may have access to the lower-level memory. Thus, based further on the number of processing units that require the data and whether the processing units are grouped together to form a same cluster, it is possible to determine whether to determine the data to be the reuse data, and determine which level memory the reuse data is to be stored.

Additionally, a characteristic of the assigned workloads may be considered to determine the reuse data. For example, a workload among the workloads assigned to the accelerator may need to be rapidly processed, while another workload may only need to be processed within a preset time. Thus, to enhance the overall system efficiency, reuse data for the workload that needs to be processed as fast as possible may be assigned in a higher priority at an initial step, and then reuse data for the workload that needs to be processed within a preset time may be assigned in a higher priority as the preset time approaches. As described above, a processing schedule for each workload may be additionally considered, and thus reuse data may be dynamically determined.

As described above, the reuse data may be determined for each memory of the multilevel memory. For example, reuse data may be determined for each of the LV0 memory 410, the LV1 memory 420, and the LV2 memory 430. In addition, the reuse data may be determined for each layer of a neural network corresponding to a workload. For example, when operations are performed in sequential order along a plurality of layers included in the neural network, reuse data suitable for each of the layers may be determined. For example, data that is more frequently utilized again in subsequent layers may be determined to be reuse data having a higher priority. In this example, data associated with the operations based on the neural network may include an input feature map (IFM), an output feature map (OFM), and a weight (WGHT). In addition, when the operations are performed in sequential order along the layers, the type of data to be selected as the reuse data may change dynamically. For example, reuse data determined in frontal layers may have a higher proportion of IMF. In contrast, reuse data determined in rearward layers may have a higher proportion of WGHT. Thus, the type of data to be selected as reuse data may change dynamically based on a workload, a neural network, and/or an operation.

Based on the factors described above, reuse data that minimizes an access to an external memory of an accelerator when a plurality of processing units of the accelerator performs one or more workloads may be determined. The reuse data may be determined such that the access to the external memory is minimized for all the workloads assigned to the accelerator and for all the processing units, not for a certain workload or a portion of the processing units.

Figure 5:
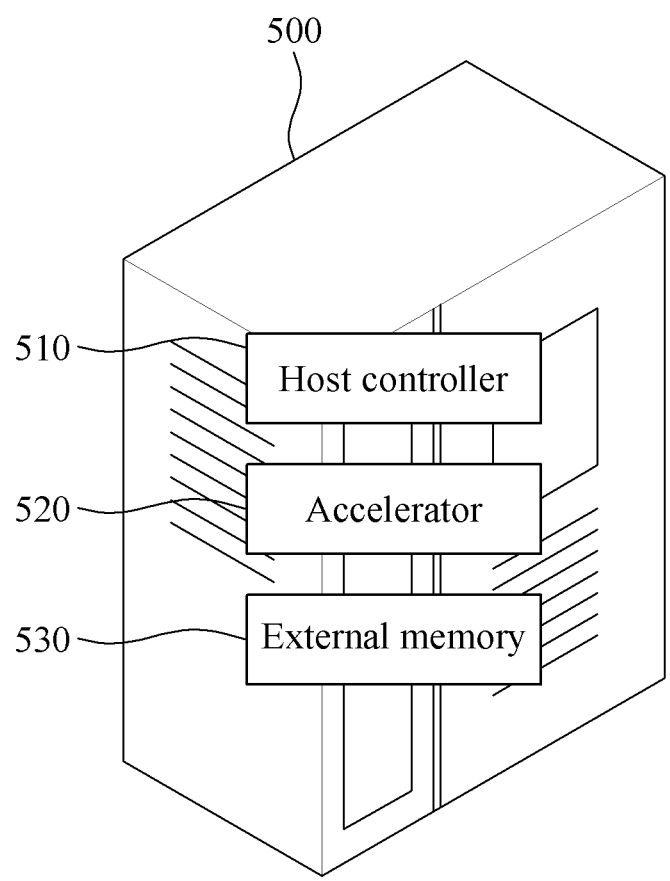
FIGS. 5 and 6 are diagrams illustrating examples of an accelerator system.
Figure 6:
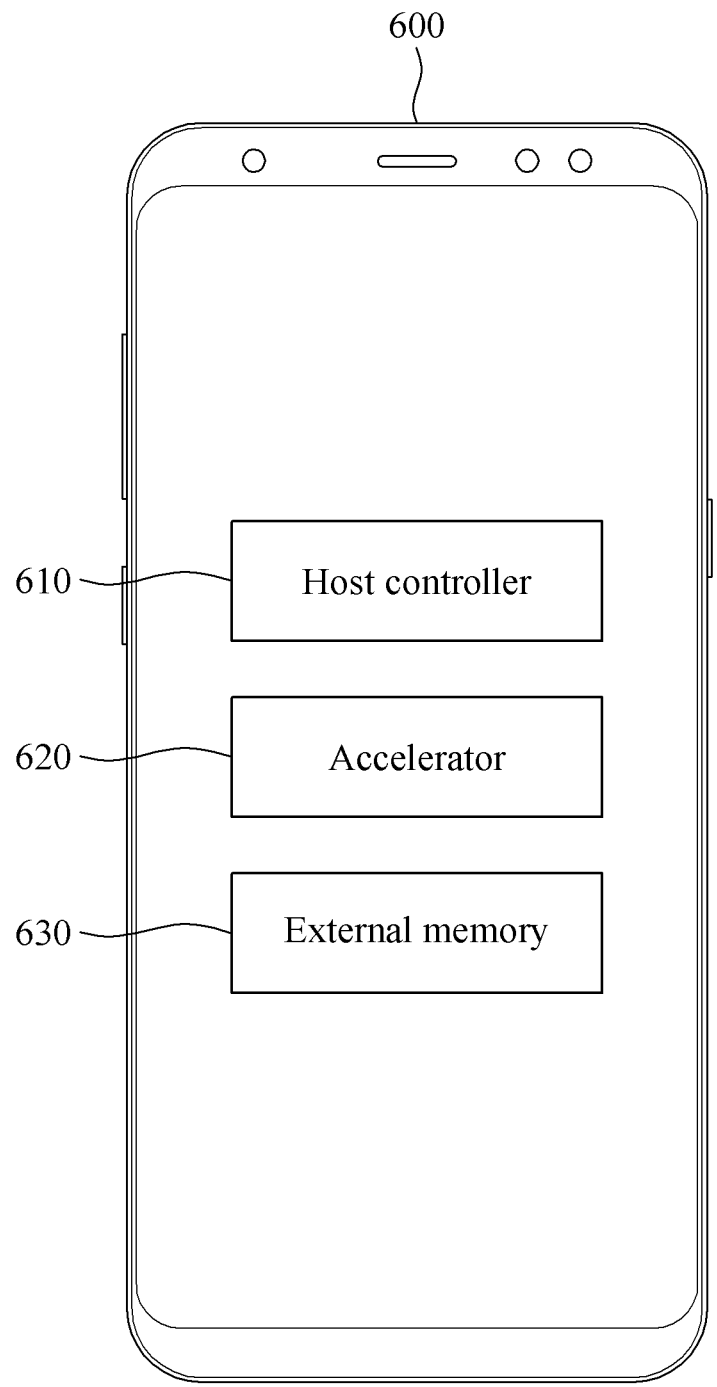

FIGS. 5 and 6 are diagrams illustrating examples of an accelerator system.

Referring to FIG. 5, a server 500 may include a host controller 510, an accelerator 520, and an external memory 530. The host controller 510 may assign one or more workloads to the accelerator 520. When the accelerator 520 performs the workloads through a plurality of processing units, the accelerator 520 may determine, at least, one set of reuse data based on hardware resource information and/or a memory access cost. The accelerator 520 may perform the workloads using the reuse data, and provide a result of performing the workloads. In an example, the server 500 may be an accelerator system.

Referring to FIG. 6, a user terminal 600 may include a host controller 610, an accelerator 620, and an external memory 630. Each of these components may perform respective operations described herein. Although the user terminal 600 is illustrated as a smartphone in FIG. 6 for the convenience of description, the description provided above with reference to FIG. 6 may also be applicable to various computing devices such as a personal computer (PC), a tablet PC, and a laptop, various wearable devices such as a smart watch and smart eyeglasses, various home appliances such as a smart speaker, a smart TV, and a smart refrigerator, and other devices such as a smart vehicle, a smart kiosk, and Internet of things (IoT) devices, without restriction.

As described above, an accelerator (e.g., the accelerators 520 and 620) may be included in a user terminal (e.g., the user terminal 600) to which data to be recognized using a neural network based on a workload is input, or in a server (e.g., the server 500) configured to receive the data to be recognized from the user terminal.

Figure 7:
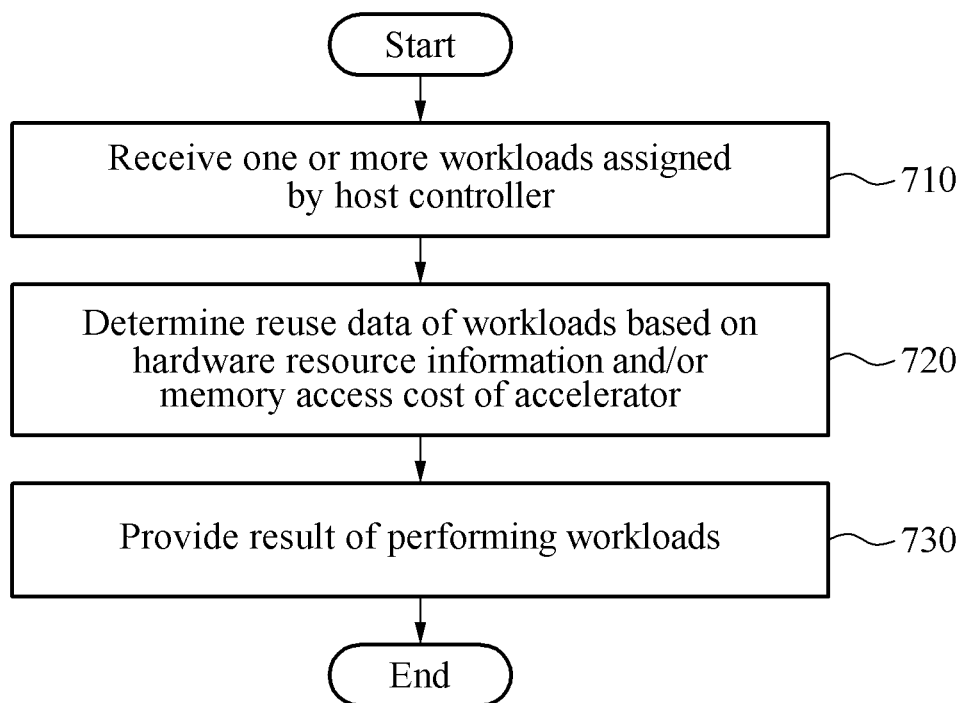
FIG. 7 is a flowchart illustrating an example of an operation method of an accelerator.

FIG. 7 is a flowchart illustrating an example of an operation method of an accelerator.

An operation method to be described hereinafter may be performed by an accelerator.

Referring to FIG. 7, in operation 710, the accelerator may receive, from a host controller, one or more workloads assigned by the host controller.

In operation 720, when performing the workloads in a plurality of processing units included in the accelerator, the accelerator may determine reuse data of the workloads based on hardware resource information and/or a memory access cost of the accelerator. When the processing units perform the workloads, the accelerator may determine the reuse data that minimizes an access to an external memory of the accelerator. The accelerator may dynamically determine the reuse data additionally based on characteristics of the workloads. The reuse data may refer to data that is stored in an internal multilevel memory of the accelerator and may not be transmitted to the external memory of the accelerator.

The hardware resource information of the accelerator may include usage information of the multilevel memory included in the accelerator and usage information of the processing units. The memory access cost may include an access cost for the external memory and an access cost for the multilevel memory included in the accelerator.

In operation 730, the accelerator may provide a result of performing the workloads. The accelerator may transmit the result of performing the workloads to the host controller.

What has been described above with reference to FIGS. 1 through 6 may be applied to the operations described above with reference to FIG. 7, and thus a more detailed and repeated description will be omitted here for brevity.

The accelerator, the accelerator system 100, 200, accelerator 120, 520, 620, host controller 110, 470, 510, 610, external memory controller 130, external memory 140, 530, 630, processing unit 210, LV0 memory 310, 410, LV1 memory 320, 420, LV2 memory 330, 430, external memory 340, 440, DMA 350, 450, reuse data policy maker 460, server 500, and other apparatuses, units, modules, devices, and other components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An operation method of an electronic device, comprising:
   receiving one or more workloads assigned on an accelerator comprising a plurality of processing elements;
   determining, upon the plurality of processing elements performing the workloads, reuse data among data of the workloads, based on at least one of hardware resource information and a memory access cost of the accelerator of a current operation of the one or more workloads; and
   performing the workloads on the accelerator based on the reuse data,
   wherein the reuse data is data reutilized in a subsequent operation to the current operation of the one or more workloads, and
   wherein the at least one of the hardware resource information and the memory access cost is determined through an extension offloaded to a direct memory access (DMA), the DMA is configured to control the data of the workloads input to the multilevel memory comprised in the accelerator or data output from the multilevel memory.

2. The operation method of claim 1, wherein the reuse data is the data with a least number of accesses by the accelerator to an external memory when the processing elements perform the one or more workloads.

3. The operation method of claim 1, wherein the determining of the reuse data is based on the hardware resource information, the hardware resource information of the accelerator comprises at least one of usage information of a multilevel memory comprised in the accelerator, usage information of the processing elements, or system cache information.

4. The operation method of claim 3, wherein the multilevel memory comprises at least one of:
   a level 0 memory accessible by one of the processing elements;
   a level 1 memory accessible by a subset of the processing elements, wherein the subset is a number greater than one; or
   a level 2 memory accessible by the processing elements.

5. The operation method of claim 1, wherein the determining of the reuse data further comprises:
   dynamically determining the reuse data based on a characteristic of the one or more workloads.

6. The operation method of claim 1, wherein the memory access cost comprises an access cost for an external memory of the accelerator and an access cost for a multilevel memory comprised in the accelerator.

7. The operation method of claim 6, wherein the access cost for the external memory is greater than the access cost for the multilevel memory.

8. The operation method of claim 6, wherein the access cost for the multilevel memory increases when a memory portion of the multilevel memory is shared by a greater number of processing elements among the processing elements.

9. The operation method of claim 1, wherein the determining of the reuse data comprises:
   determining a tiling method to be applied to the data for performing a workload of the workloads based on the hardware resource information of the accelerator; and
   determining a size of the reuse data based on the determined tiling method.

10. The operation method of claim 1, wherein the determining of the reuse data uses at least one of a multilevel memory disposed in the accelerator and a plurality of layer of a neural network, each layer of the plurality of layer corresponds to a workload.

11. The operation method of claim 1, further comprising storing the determined reuse data in a multilevel memory in the accelerator and not transmitted to an external memory of the accelerator.

12. The operation method of claim 1, wherein each of the processing elements comprises:
   a level 0 memory accessible by a corresponding processing unit;
   a level 0 DMA configured to control a data input and output of the level 0 memory, and at least one of monitor and profile data input to or output from the level 0 memory;
   a multiplier-accumulator (MAC) configured to perform a corresponding operation involved with a workload of the workloads assigned to the processing unit; and
   a level 0 controller configured to control one of the level 0 memory, the level 0 DMA, and the MAC, or a combination thereof.

13. The operation method of claim 1, wherein the accelerator is comprised in a user terminal to which data to be recognized using a neural network based on a workload is input, or in a server configured to receive the data to be recognized from the user terminal.

14. A non-transitory computer-readable storage medium storing commands that, when executed by a processor, cause the processor to
   receiving one or more workloads assigned on an accelerator comprising a plurality of processing elements;
   determining, upon the plurality of processing elements performing the workloads, reuse data of the workloads based on at least one of hardware resource information and a memory access cost of the accelerator of a current operation of the one or more workloads; and
   performing the workloads on the accelerator based on the reuse data,
   wherein the reuse data is data reutilized in a subsequent operation to the current operation of the one or more workloads, and
   wherein the at least one of the hardware resource information and the memory access cost is determined through an extension offloaded to a direct memory access (DMA), the DMA is configured to control the data of the workloads input to the multilevel memory comprised in the accelerator or data output from the multilevel memory.

15. An accelerator comprising:
   a plurality of processing elements configured to perform one or more workloads; and
   a multilevel memory configured to be accessible by at least one of the processing elements,
   wherein, when the processing elements perform the workloads, reuse data of the workloads is determined among data of the workloads based on at least one of hardware resource information and a memory access cost of the accelerator of a current operation of the one or more workloads, and stored in the multilevel memory, and
   wherein the reuse data is data reutilized in a subsequent operation to the current operation of the one or more workloads, and
   wherein the at least one of the hardware resource information and the memory access cost is determined through an extension offloaded to a direct memory access (DMA), the DMA is configured to control the data of the workloads input to the multilevel memory comprised in the accelerator or data output from the multilevel memory.

16. The accelerator of claim 15, wherein, when the processing elements perform the workloads, the data with a least number of accesses to an external memory of the accelerator is determined as the reuse data.

17. The accelerator of claim 15, wherein the hardware resource information of the accelerator comprises at least one of usage information of the multilevel memory comprised in the accelerator, usage information of the processing elements, or system cache information.

18. An electronic device comprising:
   an accelerator comprising:
      a plurality of processing elements configured to perform one or more workloads; and
      a multilevel memory having different access costs;
   an external memory external to the accelerator; and
   wherein, when the plurality of processing elements perform the one or more workloads, the accelerator is configured to determine reuse data among data of the workloads, based on at least one of hardware resource information and a memory access cost of the accelerator of a current operation of the one or more workloads, wherein the reuse data is data reutilized in a subsequent operation to the current operation of the one or more workloads, and wherein the at least one of the hardware resource information and the memory access cost is determined through an extension offloaded to a direct memory access (DMA), the DMA is configured to control the data of the workloads input to the multilevel memory comprised in the accelerator or data output from the multilevel memory.

19. The operation method of claim 1, wherein the determining of the reuse data is based on the hardware resource information, the hardware resource information is information of an availability of each level of a multilevel memory included in the accelerator.

20. The processor of claim 14, wherein the determining of the reuse data is based on the hardware resource information, the hardware resource information is information of an availability of each level of a multilevel memory included in the accelerator.

21. The accelerator of claim 15, wherein the determining of the reuse data is based on the hardware resource information, the hardware resource information is information of an availability of each level of a multilevel memory included in the accelerator.

22. The accelerator system of claim 18, wherein the determining of the reuse data is based on the hardware resource information, the hardware resource information is information of an availability of each level of a multilevel memory included in the accelerator.

* * * * *